(12) United States Patent
Sugaya et al.

(10) Patent No.: US 7,542,760 B2
(45) Date of Patent: Jun. 2, 2009

(54) WIRELESS COMMUNICATION SYSTEM, WIRELESS COMMUNICATION CONTROL METHOD, WIRELESS COMMUNICATION APPARATUS, METHOD OF CONTROLLING THE WIRELESS COMMUNICATION APPARATUS, AND COMPUTER PROGRAM

(75) Inventors: Shigeru Sugaya, Kanagawa (JP); Mitsuhiro Suzuki, Chiba (JP); Masaaki Akahane, Tokyo (JP); Kazuhisa Takamura, Tokyo (JP)

(73) Assignee: Sony Corporation (JP)

( * ) Notice: Subject to any disclaimer, the term of this patent is extended or adjusted under 35 U.S.C. 154(b) by 417 days.

(21) Appl. No.: 10/399,306

(22) PCT Filed: Aug. 27, 2002

(86) PCT No.: PCT/JP02/08600

§ 371 (c)(1), (2), (4) Date: Sep. 15, 2003

(87) PCT Pub. No.: WO03/021872

PCT Pub. Date: Mar. 13, 2003

(65) Prior Publication Data

US 2004/0043780 A1 Mar. 4, 2004

(30) Foreign Application Priority Data

Aug. 30, 2001 (JP) ............................. 2001-262309

(51) Int. Cl.
*H04M 3/00* (2006.01)
(52) U.S. Cl. ...................... 455/420; 456/41.2; 456/418; 456/68; 456/123
(58) Field of Classification Search ................ 455/41.1, 455/41.2, 418, 420, 419
See application file for complete search history.

(56) References Cited

U.S. PATENT DOCUMENTS

| | | | | |
|---|---|---|---|---|
| 1,450,520 A * | 4/1923 | Smith | ......................... | 160/387 |
| 6,178,323 B1 * | 1/2001 | Nagata | ....................... | 455/416 |
| 6,946,805 B2 * | 9/2005 | Segan et al. | .................. | 315/291 |
| 6,975,613 B1 * | 12/2005 | Johansson | .................... | 370/338 |
| 6,985,740 B2 * | 1/2006 | Shyy et al. | ................... | 455/453 |
| 7,058,050 B2 * | 6/2006 | Johansson et al. | ........... | 370/386 |
| 2001/0029166 A1 * | 10/2001 | Rune et al. | ..................... | 455/41 |
| 2002/0055978 A1 * | 5/2002 | Joon-Bo et al. | ............. | 709/209 |
| 2002/0090968 A1 * | 7/2002 | Lee et al. | ..................... | 455/527 |
| 2003/0081603 A1 * | 5/2003 | Rune | ........................... | 370/390 |
| 2004/0029592 A1 * | 2/2004 | Shyy et al. | ................... | 455/453 |
| 2005/0014467 A1 * | 1/2005 | Ishiwata et al. | ............... | 455/39 |

\* cited by examiner

*Primary Examiner*—Matthew D Anderson
*Assistant Examiner*—Minh D Dao
(74) *Attorney, Agent, or Firm*—Lerner, David, Littenberg, Krumholz & Mentlik, LLP

(57) ABSTRACT

Each wireless communication apparatus forming a wireless network has an operation mode in which a wireless communication apparatus becomes a control station with priority, an operation mode in which a wireless communication apparatus may operate as a control station, and an operation mode in which a wireless communication apparatus does not become a control station. By providing a function in which a user selects and sets one of these three operation modes, the wireless network can be constructed as desired by the user. As a result of providing the mode in which the wireless communication apparatus does not become a control station, a wireless communication apparatus that is connected to a device but that cannot operate as a control station is not specified as a control station. Therefore, by allowing a specific apparatus in the wireless network to function as a control station, the wireless network can be constructed.

32 Claims, 8 Drawing Sheets

| | SELECTION DETERMINED VALUE |
|---|---|
| COMMUNICATION APPARATUS A | 2 |
| COMMUNICATION APPARATUS B | 1F |
| COMMUNICATION APPARATUS C | 2F |
| COMMUNICATION APPARATUS D | - |
| COMMUNICATION APPARATUS E | - |

(A)

| | SELECTION DETERMINED VALUE |
|---|---|
| COMMUNICATION APPARATUS A | 0 |
| COMMUNICATION APPARATUS B | 3F |
| COMMUNICATION APPARATUS C | 2F |
| COMMUNICATION APPARATUS D | 2 |
| COMMUNICATION APPARATUS E | 2 |

(B)

| | SELECTION DETERMINED VALUE |
|---|---|
| COMMUNICATION APPARATUS A | 0 |
| COMMUNICATION APPARATUS B | 1F |
| COMMUNICATION APPARATUS C | 4F |
| COMMUNICATION APPARATUS D | 2 |
| COMMUNICATION APPARATUS E | 2 |

(C)

| | SELECTION DETERMINED VALUE |
|---|---|
| COMMUNICATION APPARATUS A | - |
| COMMUNICATION APPARATUS B | 1F |
| COMMUNICATION APPARATUS C | 2F |
| COMMUNICATION APPARATUS D | 3 |
| COMMUNICATION APPARATUS E | 2 |

(D)

| | SELECTION DETERMINED VALUE |
|---|---|
| COMMUNICATION APPARATUS A | - |
| COMMUNICATION APPARATUS B | - |
| COMMUNICATION APPARATUS C | 2F |
| COMMUNICATION APPARATUS D | 2 |
| COMMUNICATION APPARATUS E | 2 |

| | SELECTION DETERMINED VALUE |
|---|---|
| COMMUNICATION APPARATUS A | 2 |
| COMMUNICATION APPARATUS B | 3F |
| COMMUNICATION APPARATUS C | 4F |
| COMMUNICATION APPARATUS D | - |
| COMMUNICATION APPARATUS E | - |

(B)

| | SELECTION DETERMINED VALUE |
|---|---|
| COMMUNICATION APPARATUS A | 2 |
| COMMUNICATION APPARATUS B | 3F |
| COMMUNICATION APPARATUS C | 4F |
| COMMUNICATION APPARATUS D | 3 |
| COMMUNICATION APPARATUS E | - |

(C)

| | SELECTION DETERMINED VALUE |
|---|---|
| COMMUNICATION APPARATUS A | 2 |
| COMMUNICATION APPARATUS B | 3F |
| COMMUNICATION APPARATUS C | 4F |
| COMMUNICATION APPARATUS D | 3 |
| COMMUNICATION APPARATUS E | 2 |

(D)

| | SELECTION DETERMINED VALUE |
|---|---|
| COMMUNICATION APPARATUS A | - |
| COMMUNICATION APPARATUS B | 3F |
| COMMUNICATION APPARATUS C | 4F |
| COMMUNICATION APPARATUS D | 3 |
| COMMUNICATION APPARATUS E | 2 |

(E)

| | SELECTION DETERMINED VALUE |
|---|---|
| COMMUNICATION APPARATUS A | - |
| COMMUNICATION APPARATUS B | - |
| COMMUNICATION APPARATUS C | 4F |
| COMMUNICATION APPARATUS D | 3 |
| COMMUNICATION APPARATUS E | 2 |

FIG. 11

WIRELESS COMMUNICATION SYSTEM, WIRELESS COMMUNICATION CONTROL METHOD, WIRELESS COMMUNICATION APPARATUS, METHOD OF CONTROLLING THE WIRELESS COMMUNICATION APPARATUS, AND COMPUTER PROGRAM

TECHNICAL FIELD

The present invention relates to a wireless communication system, a wireless communication control apparatus, a wireless communication control method, and a computer program for performing communication among a plurality of wireless stations, and in particular, it relates to a wireless communication system, a wireless communication control apparatus, a wireless communication control method, and a computer program in which a wireless network in which terminals directly communicate with each other is constructed.

More specifically, the present invention relates to a wireless communication system, a wireless communication control apparatus, a wireless communication control method, and a computer program for constructing a wireless network by allowing a specific apparatus within the wireless network to function as a control station (coordinator), and in particular, it relates to a wireless communication system, a wireless communication control apparatus, a wireless communication control method, and a computer program for constructing a wireless network by allowing a specific apparatus to operate as a control station with priority.

BACKGROUND ART

As computers have advanced, it is common to connect a plurality of computers to construct a LAN (Local Area Network), so that information on files and data is shared, peripheral devices such as printers are shared, and information exchange such as electronic mail and data transfer is performed.

In a conventional LAN, each computer is connected by wires by using optical fibers, coaxial cables, or twisted-pair cables. In such a wired LAN, however, construction work is required for connection. It is difficult to construct a LAN with ease, and the cabling is complex. Furthermore, after a LAN is constructed, the range in which devices can move is limited by the length of the cable, and this is inconvenient.

In connection with the above, as a system in which a user is released from the wiring of a LAN associated with a conventional wired method, a wireless LAN has attracted attention. According to this type of wireless LAN, in a work space such as in an office, since most of the cables can be omitted, terminals such as personal computers (PCs) can be moved relatively easily.

As a method of constructing a wireless network, a method in which one of the wireless transmission apparatuses forming the wireless network is used as a control station (coordinator) of the network is conceived.

For example, in Japanese Unexamined Patent Application Publication No. 2000-138685 which has already been assigned to the applicant of the present invention, a wireless transmission control method in which a wireless network is automatically configured by making all of the stations have a function for operating as a control station is disclosed.

According to the wireless transmission control method described in that publication, the communication station which is selected as a central control station determines stations with which each terminal station within the wireless network can directly perform wireless communication. When it is detected that wireless communication can be performed with a communication station in which the number of terminal stations is greater than the number of stations which can directly perform wireless communication with the central control station, the communication station performs a process for changing the detected terminal station to a central control station. That is, a station suitable for controlling each communication station within the wireless network is automatically selected as a central control station, and thus the wireless network is automatically constructed suitably. Therefore, even if the control station is not set in advance, it is possible to cause a specific apparatus within the network to operate as a control station, making it possible to construct a wireless network in which wireless transmission apparatuses are placed freely.

A method is further conceived in which a wireless transmission apparatus suitable as a control station is selected and it is made to function as a control station with priority.

For example, in Japanese Patent Application No. 2001-174766 which has already been assigned to the applicant of the present invention, a wireless communication system capable of causing a wireless transmission apparatus determined by a user to operate as a control station with priority is disclosed.

According to the wireless communication system described in that specification, setting is performed beforehand in a communication apparatus which is desired to be set as a control station so as to function as a control station with priority. In a case where this function is set in a plurality of communication apparatuses, a control station is selected according to the number of apparatuses capable of performing communication with the apparatus. Therefore, when a control station is determined automatically to construct a wireless network, it is possible to cause the wireless transmission apparatus set by the user to operate as a control station with priority.

However, in these conventional wireless network construction methods, in general, since an apparatus which serves as a control station is simply specified, it is not possible to specifically exclude a transmission apparatus which is not suitable as a control station.

For example, even if a terminal station is an apparatus which is not suitable as a control station because its computation function is poor, such as headphones, or if a terminal station is an apparatus which is not suitable as a control station whose power consumption is large because it is battery driven, there is still a possibility that the apparatus is selected as a control station in the above-described wireless network construction method.

Furthermore, even when a function capable of serving as a control station with priority is provided, in a communication environment in which only wireless transmission apparatuses that are not provided with a function capable of serving as a control station with priority exist, there is a problem in that a wireless network cannot be constructed unless a control station is selected from among these apparatuses.

For this reason, a problem arises in that a wireless transmission apparatus that is not suitable as a control station is selected when constructing the wireless network.

DISCLOSURE OF INVENTION

An object of the present invention is to provide a superior wireless communication control apparatus, a superior wireless communication control method, and a superior computer program, which are capable of suitably constructing a wireless network by allowing a specific apparatus within the wireless network to function as a control station (coordinator).

Another object of the present invention is to provide a superior wireless communication control apparatus, a superior wireless communication control method, and a superior computer program, which are capable of suitably constructing a wireless network by allowing a specific apparatus to operate as a control station with priority.

Another object of the present invention is to provide a superior wireless communication control apparatus, a superior wireless communication control method, and a superior computer program, which are capable of suitably constructing a wireless network by determining a control station in such a manner as to exclude a wireless transmission apparatus which is not suitable as a control station.

The present invention has been made in view of the above-described objects. A first aspect of the present invention is directed to a wireless communication system or a wireless communication control method of a type in which a wireless network comprising a plurality of wireless communication apparatuses are constructed as a result of one wireless communication apparatus operating as a control station, comprising a mode setting section or step for setting the operation mode of the apparatus to one of a first operation mode in which the apparatus operates as a control station with priority, a second operation mode in which the apparatus may operate as a control station, and a third operation mode in which the apparatus cannot operate as a control station.

The "system" referred to herein refers to a logical assembly of a plurality of devices (or function modules which realize specific functions), and it does not matter particularly whether or not each device and function module is within a single housing.

A second aspect of the present invention is directed to a wireless communication system or a wireless communication control method of a type in which a wireless network comprising a plurality of wireless communication apparatuses are constructed as a result of one wireless communication apparatus operating as a control station, comprising a mode setting section or step for setting the operation mode of each wireless communication apparatus to one of a first operation mode in which the apparatus operates as a control station with priority and a third operation mode in which the apparatus cannot operate as a control station.

A third aspect of the present invention is directed to a wireless communication system or a wireless communication control method of a type in which a wireless network comprising a plurality of wireless communication apparatuses are constructed as a result of one wireless communication apparatus operating as a control station, comprising a mode setting section or step for setting the operation mode of each wireless communication apparatus to one of a second operation mode in which the apparatus may operate as a control station and a third operation mode in which the apparatus cannot operate as a control station.

According to the wireless communication system or the wireless communication control method in accordance with each of the first to third aspects of the present invention, each wireless communication apparatus that operates on the wireless network comprises the third operation mode in which the apparatus cannot operate as a control station in addition to the first operation mode in which the apparatus operates as a control station with priority and the second operation mode in which the apparatus may operate as a control station, and thus the mode can be set in accordance with the user operation.

Therefore, in a network configuration in which each wireless communication apparatus can function as a control station, a wireless communication apparatus which serves as a control station can be set automatically to construct a wireless network, whereas setting can be performed so that a device which is not suitable as a control station because its computation function is poor, such as headphones, or a device which is not suitable to operate as a control station whose power consumption is large because it is battery driven is not selected as a control station.

Here, in response to the switching to the first operation mode in which one wireless communication apparatus within the wireless network operates as a control station with priority, the wireless communication apparatus may operate as a control station. At this time, when another wireless communication apparatus that operates as a control station exists in the wireless network, by performing a control-station changing operation, the wireless communication apparatus which is newly switched to the first operation mode by the user is allowed to operate as a control station with priority (that is, in accordance with the intention of the user).

Furthermore, in response to the switching to the third operation mode in which one wireless communication apparatus within the wireless network does not operate as a control station, the wireless communication apparatus may join the wireless network as a terminal station.

Furthermore, when the apparatus is switched to the second operation mode in which the wireless communication apparatus may operate as a control station, if a control station already exists in the wireless network, the wireless communication apparatus may join the wireless network as a terminal station.

Furthermore, when the wireless communication apparatus is switched to the second operation mode in which the apparatus may operate as a control station, if a control station does not exist in the wireless network, a control station may be determined by a predetermined control-station selection process. In this control-station selection process, a control station may be determined on the basis of the number of the other wireless communication apparatuses with which each wireless communication apparatus set to the second operation mode can communicate.

A fourth aspect of the present invention is directed to a wireless communication apparatus that operates on a wireless network constructed in such a manner that one wireless communication apparatus is selected as a control station or a wireless communication apparatus control method, comprising:

a mode setting section or a mode setting step for setting the operation mode of the apparatus to one of a first operation mode in which the apparatus operates as a control station with priority, a second operation mode in which the apparatus may operate as a control station, and a third operation mode in which the apparatus cannot operate as a control station; and a control section or a control step for controlling the operation of the wireless network in accordance with the operation mode set by the mode setting section.

A fifth aspect of the present invention is directed to a wireless communication apparatus that operates on a wireless network constructed in such a manner that one wireless communication apparatus is selected as a control station or a wireless communication apparatus control method, comprising:

a mode setting section or a mode setting step for setting the operation mode of the apparatus to one of a first operation mode in which the apparatus operates as a control station with priority and a third operation mode in which the apparatus cannot operate as a control station; and a control section or a control step for controlling the operation of the wireless network in accordance with the operation mode set by the mode setting section.

A sixth aspect of the present invention is directed to a wireless communication apparatus that operates on a wireless network constructed in such a manner that one wireless communication apparatus is selected as a control station or a wireless communication apparatus control method, comprising:

a mode setting control section or a mode setting step for setting the operation mode of the apparatus to one of a second operation mode in which the apparatus may operate as a control station and a third operation mode in which the apparatus cannot operate as a control station; and a control section or a control step for controlling the operation of the wireless network in accordance with the operation mode set by the mode setting section.

According to the wireless communication apparatus or the wireless communication apparatus control method in accordance with each of the fourth to sixth aspects of the present invention, each wireless communication apparatus that operates on the wireless network comprises the third operation mode in which the apparatus cannot operate as a control station in addition to the first operation mode in which the apparatus operates as a control station with priority and the second operation mode in which the apparatus may operate as a control station, and thus the mode can be set in accordance with the user operation.

Therefore, in a network configuration in which each wireless communication apparatus can function as a control station, a wireless communication apparatus which serves as a control station can be set automatically to construct a wireless network, whereas setting can be performed so that a device which is not suitable as a control station because its computation function is poor, such as headphones, or a device which is not suitable to operate as a control station whose power consumption is large because it is battery driven is not selected as a control station.

Here, in response to the switching by the mode setting section to the first operation mode in which the wireless communication apparatus operates as a control station with priority, the control section or the control step may allow the wireless communication apparatus to operate as a control station. At this time, when another wireless communication apparatus that operates as a control station exists in the wireless network, by performing a control-station changing operation, the wireless communication apparatus which is newly switched to the first operation mode by the user may be allowed to operate as a control station with priority (that is, in accordance with the intention of the user).

Furthermore, in response to the switching by the mode setting section to the third operation mode in which the wireless communication apparatus does not operate as a control station, the control section or the control step may allow the wireless communication apparatus to join the wireless network as a terminal station.

Furthermore, when the wireless communication apparatus is switched to the second operation mode in which the apparatus may operate as a control station, if a control station already exists in the wireless network, the control section or the control step may allow the wireless communication apparatus to join the wireless network as a terminal station.

Furthermore, when the wireless communication apparatus is switched to the second operation mode in which the apparatus may operate as a control station, if a control station does not exist in the wireless network, the control section or the control step may determine a control station by a predetermined control-station selection process. At this time, in the control-station selection process, the control section or the control step may determine a control station on the basis of the number of other wireless communication apparatuses with which each wireless communication apparatus set to the second operation mode can communicate.

A seventh aspect of the present invention is directed to a computer program written in a computer-readable form so that control of a wireless communication apparatus that operates on a wireless network constructed in such a manner that one wireless communication apparatus is selected as a control station is executed on a computer system, the computer program comprising:

a mode setting step of setting the operation mode of the apparatus to one of a first operation mode in which the apparatus operates as a control station with priority, a second operation mode in which the apparatus may operate as a control station, and a third operation mode in which the apparatus cannot operate as a control station; and a control step of controlling the operation of the wireless network in accordance with the operation mode set by the mode setting section.

The computer program in accordance with the seventh aspect of the present invention is such that a computer program written in a computer-readable form so that a predetermined process is realized on a computer system is defined. In other words, by installing a computer program in accordance with the seventh aspect of the present invention into a computer system, cooperative operations are exhibited on the computer system, and the same operational advantages as those of the wireless communication apparatus or the wireless communication apparatus control method in accordance with the fourth aspect of the present invention can be obtained.

Further objects, features, and advantages of the present invention will become apparent from the following detailed description of the embodiments of the present invention with reference to the attached drawings.

BRIEF DESCRIPTION OF THE DRAWINGS

FIG. 10 shows examples of the stored contents of a selection determining value of each wireless communication apparatus when a control-station selection process for the first time is terminated in the control-station selection process.

FIG. 11 shows examples of the stored contents of a selection determining value of each wireless communication apparatus when a control-station selection process for the second time is terminated in the control-station selection process.

BEST MODE FOR CARRYING OUT THE INVENTION

The embodiments of the present invention will now be described below in detail with reference to the drawings.

Figure 1:
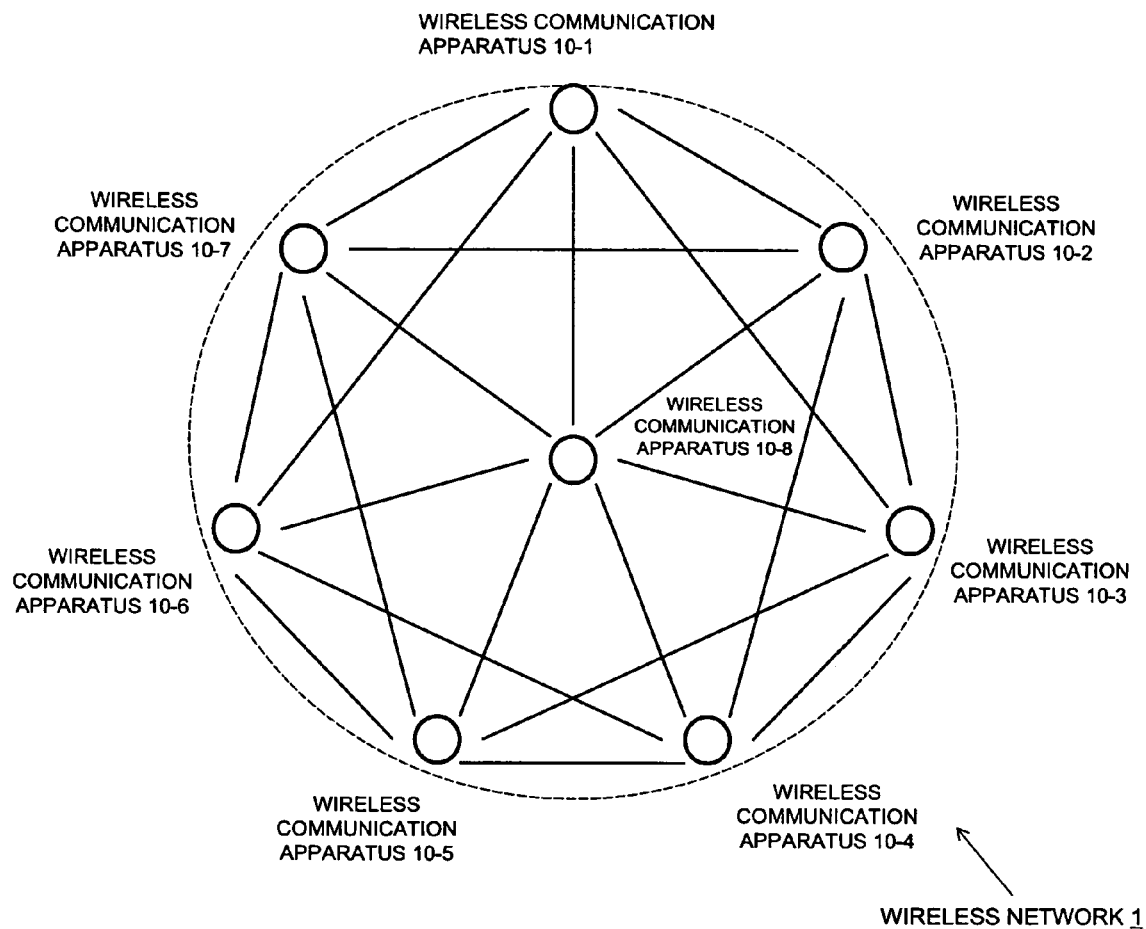
FIG. 1 schematically shows the configuration of a wireless network 1 according to one embodiment of the present invention.

FIG. 1 schematically shows the configuration of a wireless network 1 according to one embodiment of the present invention. The wireless network 1 comprises a plurality of wireless communication apparatuses 10-1, 10-2, . . . The wireless communication apparatuses 10-1, 10-2, . . . are configured in such a manner that, for example, wireless communication units having a wireless transmission/receiving function are locally connected to an ordinary computer system such as a personal computer (PC).

In the wireless network 1 in FIG. 1, one wireless communication apparatus 10-8 functions as a coordinator, that is, it functions as a control station for the wireless network 1, and the other wireless communication apparatuses 10-1, . . . , 10-7 are connected via the wireless network 1 under the communication control of the wireless communication apparatus 10-8.

It is assumed here that the wireless communication apparatus 10-8 is set in a mode in which it can easily perform communication with all the other wireless communication apparatuses 10-1, . . . , 10-7 and that it exists at a position suitable for use as a control station.

Furthermore, it is estimated that, since the wireless communication apparatus 10-1 exists at a position relatively close to the wireless communication apparatuses 10-2, 10-7, and 10-8, the wireless communication apparatus 10-1 can easily transmit information to those apparatuses, and, in contrast, since the wireless communication apparatus 10-1 exists at a position relatively far away from the wireless communication apparatuses 10-3 and 10-6, there are cases in which transmission of information is slightly difficult. Furthermore, this shows a situation where wireless communication cannot be performed since the wireless communication apparatus 10-1 is distant from the wireless communication apparatuses 10-4 and 10-5.

In a similar manner, regarding each of the remaining wireless communication apparatuses 10-2 to 10-7, it should be understood that the communication state is determined based on the positional relationship (shown in the figure) with the other wireless communication apparatuses which exist nearby.

Figure 2:
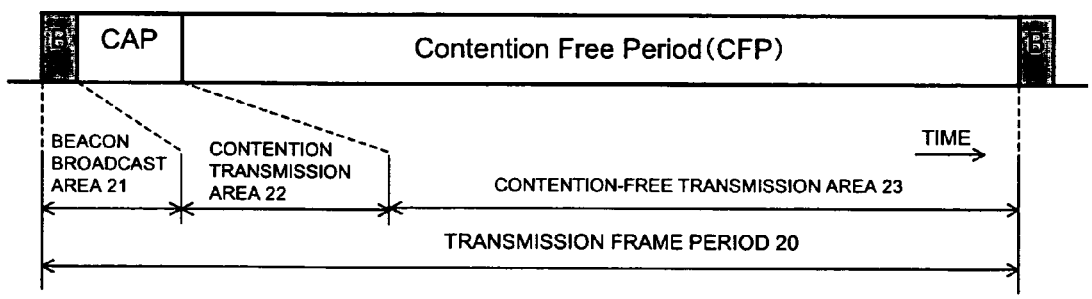
FIG. 2 shows an example of the structure of a frame used for data transmission in the wireless network 1 according to this embodiment.

FIG. 2 shows an example of the structure of a frame used for data transmission in the wireless network 1 according to this embodiment.

In FIG. 2, a transmission frame period 20 is composed of a beacon broadcast area (B) 21 at the beginning of the frame, which is broadcast from the control station (wireless communication apparatus 10-8) to the wireless network 1, a contention transmission area (contention access period (CAP)) 22 used to perform, for example, processing for joining the wireless network 1 or to exchange short asynchronous information and commands, and a contention-free transmission area (contention-free period (CFP)) 23 in which each of the wireless communication apparatuses 10-1 . . . performs band reservation in order to perform information transmission, and the period up to the next beacon broadcast area is provided as one transmission frame period.

The structure within such a transmission frame 20 is written in the beacon information, at the beginning of the frame, which is broadcast to the wireless network 1.

Figure 3:
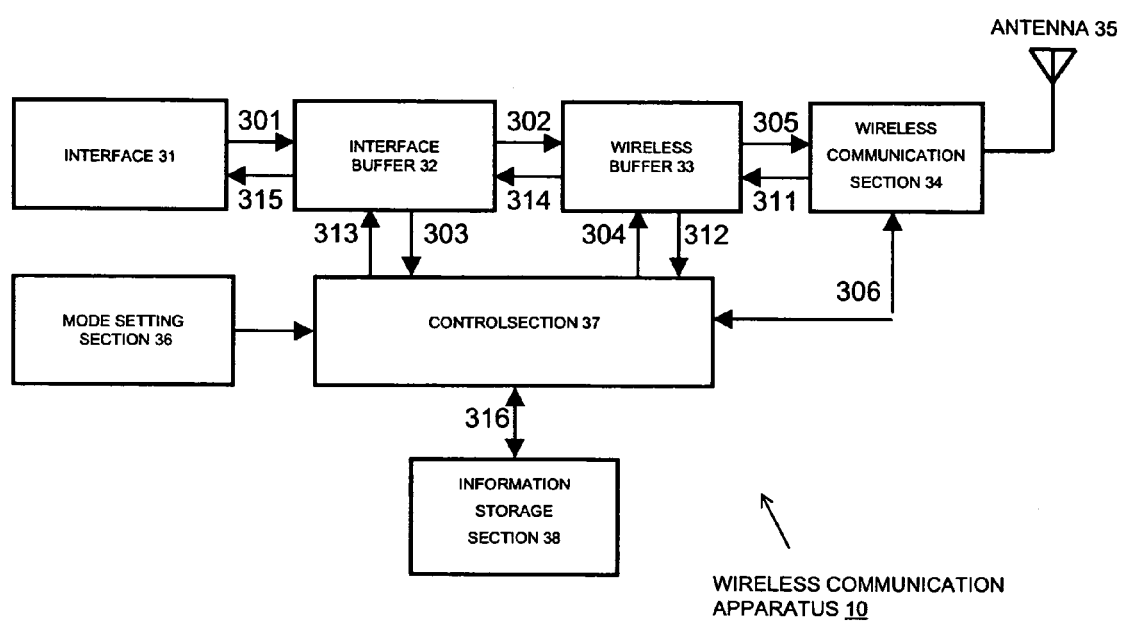
FIG. 3 schematically shows the configuration of a wireless communication apparatus 10 which can operate in the wireless network 1 according to this embodiment.

FIG. 3 schematically shows the configuration of a wireless communication apparatus 10 which can operate in the wireless network 1 according to this embodiment. As shown in FIG. 3, the wireless communication apparatus 10 comprises an interface 31, an interface buffer 32, a wireless buffer 33, a wireless communication section 34, an antenna 35, a mode setting section 36, a control section 37, and an information storage section 38.

The interface 31 is connected to an external device (not shown) such as a personal computer (PC). The interface buffer 32 is a buffer for storing media information 301 which has arrived from the external device. The wireless buffer 33 stores, as wireless transmission packets, information 302 for wireless transmission sent from the interface buffer 32.

The control section 37 centrally controls a series of data transmission processes in this wireless communication apparatus 10. That is, in response to a wireless transmission notification 303, if band reservation transmission is required, the control section 37 stores a reservation request 304 in the wireless buffer 33 for wireless transmission, and by using the contention transmission area (CAP) within the transmission frame, the wireless communication section 34 transmits the reservation request to the wireless communication apparatus 10-8 via the antenna 35.

The signal received in the wireless communication apparatus 10 is supplied to a wireless communication section 34 via an antenna 35 and the signal is sent as a decoded signal 311 to a wireless buffer 33.

Then, when the received signal is beacon broadcast information 312 which is periodically sent from the control station, it is supplied to the control section 37. In the control section 37, the corresponding reservation band assignment information is confirmed, a setting 306 for the wireless communication section 34 is performed in accordance with the control thereof, and wireless transmission packets 305 stored in the wireless buffer 33 are transmitted wirelessly from the antenna 35 via the wireless communication section 34.

If reception has been specified in the network broadcast information 312, in accordance with the control thereof, setting of the wireless communication section 34 is performed, and a signal is received at a predetermined timing.

The received information 311 is stored in the wireless buffer 33, after which the control section 37 reconstructs the received information in accordance with the instruction 304 at each predetermined receiving process interval and passes the information to the interface buffer 32.

Then, the interface 31 passes this information, as information 315 in a predetermined interface format, to an external device (not shown) via the interface 31.

The wireless communication apparatus 10 shown in the figure is provided with the mode setting section 36 for controlling whether or not it should operate as a control station, and a signal 307 for identifying the operation mode as the control station is reported to the control section 37.

The control section 37 according to this embodiment has a function for performing a network construction processing sequence on the basis of the mode set in the mode setting section 36. That is, the control section 37 determines whether or not the wireless communication apparatus 10 can become a control station for the network in accordance with the instruction from the mode setting section 36.

In response to an instruction from the user via a user interface (not shown), for example, the mode setting section 36 sets the wireless communication apparatus 10 in one of a first operation mode in which the wireless communication apparatus 10 operates as a control station with priority, a second operation mode in which the wireless communication apparatus 10 may operate as a control station, and a third operation mode in which the wireless communication apparatus 10 cannot operate as a control station.

For example, in a case where the wireless communication apparatus 10 is set by the mode setting section 36 to a mode in which the apparatus becomes a control station with priority, it is possible to make a request to the existing wireless network that the function of the control station be replaced.

Alternatively, in a case where the wireless communication apparatus 10 is set by the mode setting section 36 to a mode in which the apparatus may operate as a control station, by using a predetermined control-station selection process, it is possible to determine, as a control station, the wireless communication apparatus which is most suitable for use as a control station for the other wireless communication apparatuses.

Alternatively, in a case where the wireless communication apparatus 10 is set by the mode setting section 36 in a mode in which the apparatus does not become a control station, another wireless communication apparatus becomes a control station, after which the wireless communication apparatus 10 operates as a terminal station for the network.

In the manner described above, as a result of providing, in addition to the first and second modes, the third operation mode in which the apparatus does not operate as a control station, setting can be performed so that a device which is not suitable as a control station because its computation function is poor, such as headphones, or a device which is not suitable to operate as a control station whose power consumption is large because it is battery driven is not selected as a control station.

Such a control sequence for determining the control station is performed in accordance with instructions from the control section 37, and the control section 37 includes the information storage section 38 in which various transmission programs and control information are prestored.

Figure 4:
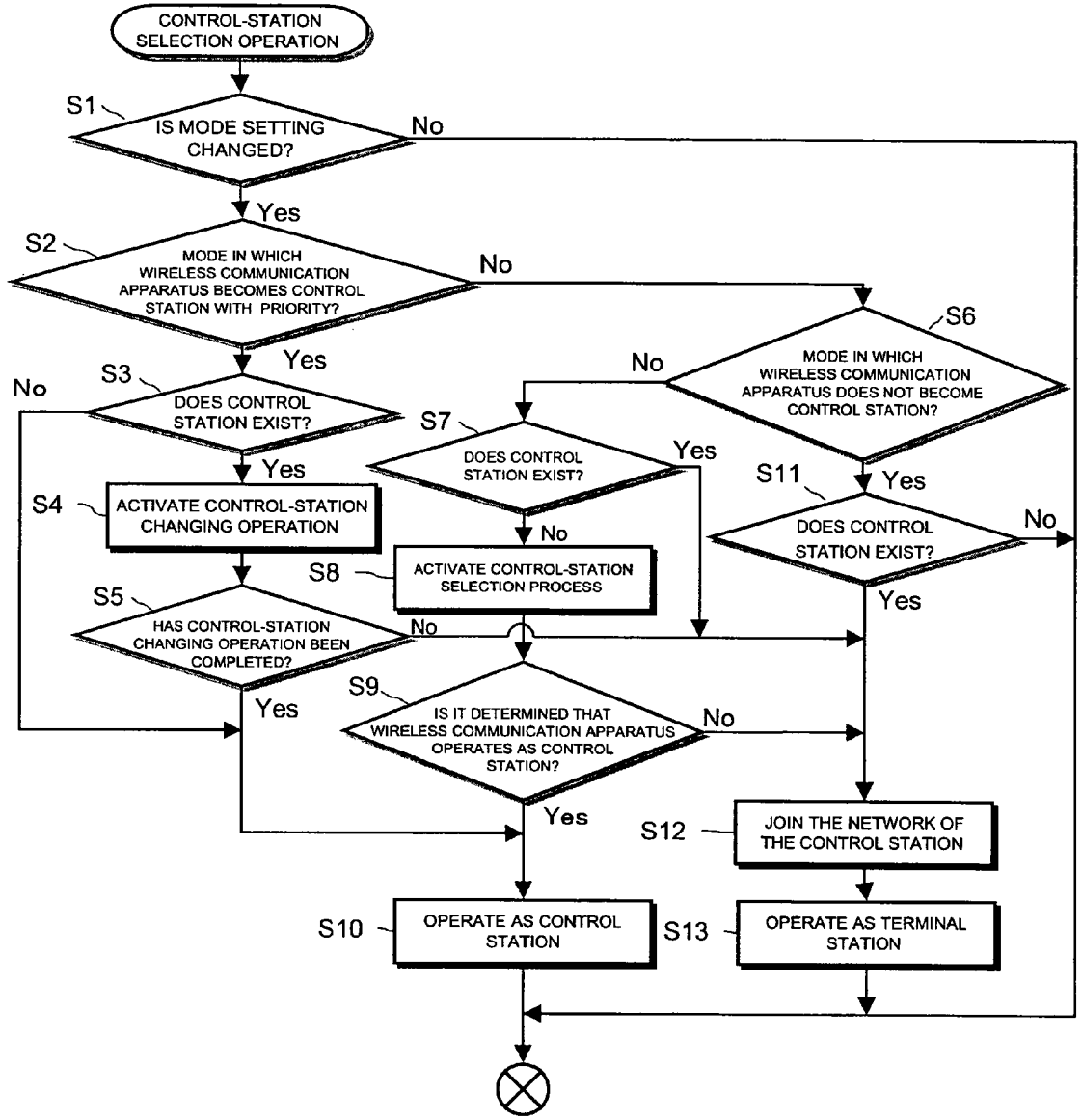
FIG. 4 is a flowchart showing a processing procedure for selecting a control station within a wireless network.

FIG. 4 shows a flowchart of a processing procedure for selecting a control station within a wireless network. In practice, this control-station selection process is realized in a form in which the control section 37 executes a predetermined program loaded from the information storage section 38. The control-station selection process will now be described below with reference to this flowchart.

Initially, when the wireless communication apparatus 10 is powered on or when the mode setting of the wireless communication apparatus 10 is switched by the user, it is determined whether or not the mode setting of the wireless communication apparatus 10 has changed (step S1).

If there is no change, the entire processing routine is terminated. When, on the other hand, there is a change, it is determined whether or not the apparatus has been set to a mode in which the apparatus becomes a control station with priority (step S2).

Here, when the apparatus has been set to a mode in which the apparatus becomes a control station with priority, in order to obey the setting such that the user wants to make the wireless communication apparatus 10 a control station with priority, it is further determined whether or not a control station already exists (step S3).

If a control station does not exist, in accordance with the "No" branch of the determination block S3, the process proceeds to step S10, where the wireless communication apparatus 10 operates as a control station. If a control station already exists, the process proceeds to step S4, where, in order to switch the control station in accordance with the user operation, a control-station changing operation is activated for the control station. The details of the control-station changing operation will be described later.

Thereafter, in step S5, it is determined whether or not the control-station changing operation is completed. When the control-station changing operation is completed, in accordance with the "Yes" branch of the determination block S5, the process proceeds to step S10, where the wireless communication apparatus 10 operates as a control station. If the control-station changing operation is not completed, in accordance with the "No" branch of the determination block S5, the process proceeds to step S12, where the wireless communication apparatus 10 operates as a terminal station in the wireless network.

In the determination block S2, when it is determined that the mode is a mode in which the apparatus does not become a control station with priority, the process proceeds to step S6, where it is determined whether or not the apparatus is in a mode in which it does not become a control station.

If the apparatus can become a control station, in accordance with the "No" branch of the determination block S6, the process proceeds to step S7, where it is determined whether or not a control station already exists. If a control station already exists, in accordance with the "Yes" branch of the determination block S7, the process proceeds to step S12, where the apparatus operates as a terminal station in the wireless network constructed by that control station. If a control station does not exist, the process proceeds to the subsequent step S8, where the control-station selection process is activated. The details of the control-station selection process will be described later.

Thereafter, when it is determined in step S9 that the apparatus operates as a control station, in accordance with the "Yes" branch of the determination block S9, the process proceeds to step S10, where the wireless communication apparatus 10 operates as a control station. If the wireless communication apparatus 10 does not operate as a control station, in accordance with the "No" branch of the determination block S9, the process proceeds to step S12, where the wireless communication apparatus 10 joins the wireless network constructed by the control station selected by the selection process, and the wireless communication apparatus 10 operates as a terminal station (step S13).

When it is determined in the determination block S6 that the apparatus is in the mode in which the apparatus does not become a control station, in accordance with the "Yes" branch of the determination block S6, the process proceeds to step S11, where it is determined whether or not a control station exists. If a control station exists, the process proceeds to step S12, where the wireless communication apparatus joins the wireless network constructed by that control station, and the wireless communication apparatus operates as a terminal station (step S13).

When it is determined in the determination block S11 that a control station does not exist, the control exits from the "No" branch, the entire processing routine is terminated, and the operation waits for a new control station to appear.

Figure 5:
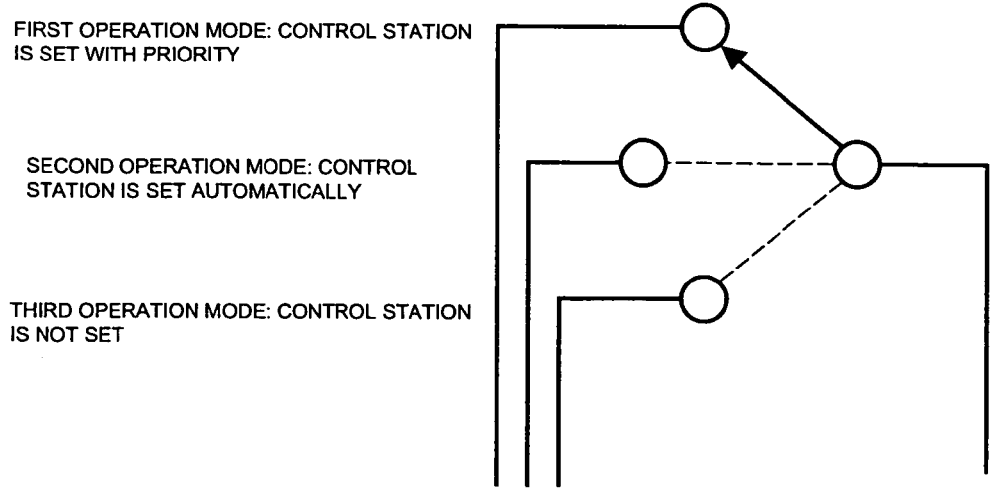
FIG. 5 shows an example of the configuration of a switch provided with a function for switching the operation mode of a control station in a mode setting section 36 shown in FIG. 3, and more specifically, shows a state in which setting for allowing the apparatus to become a control station with priority in a first operation mode is performed.
Figure 6:
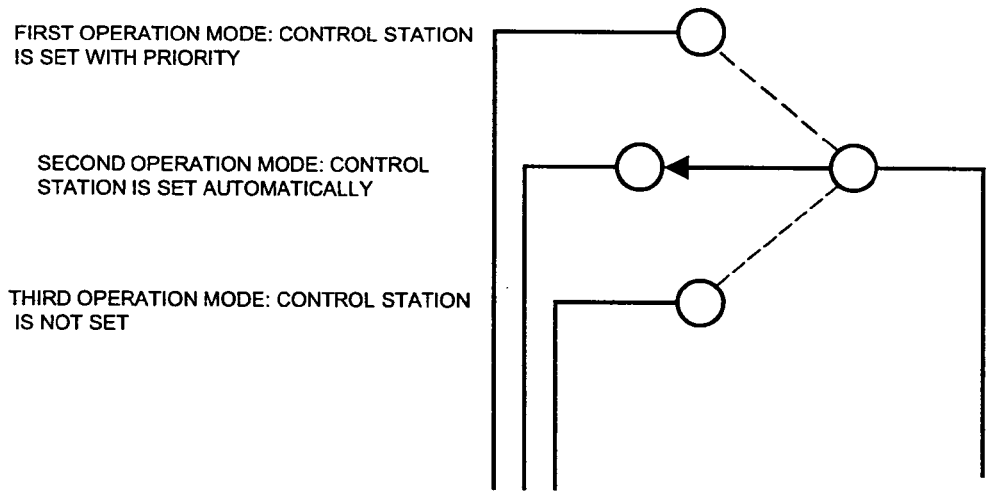
FIG. 6 shows an example of the configuration of a switch provided with a function for switching the operation mode of the control station in the mode setting section 36 shown in FIG. 3, and more specifically, shows a state in which setting for automatically selecting a control station in a second operation mode is performed.
Figure 7:
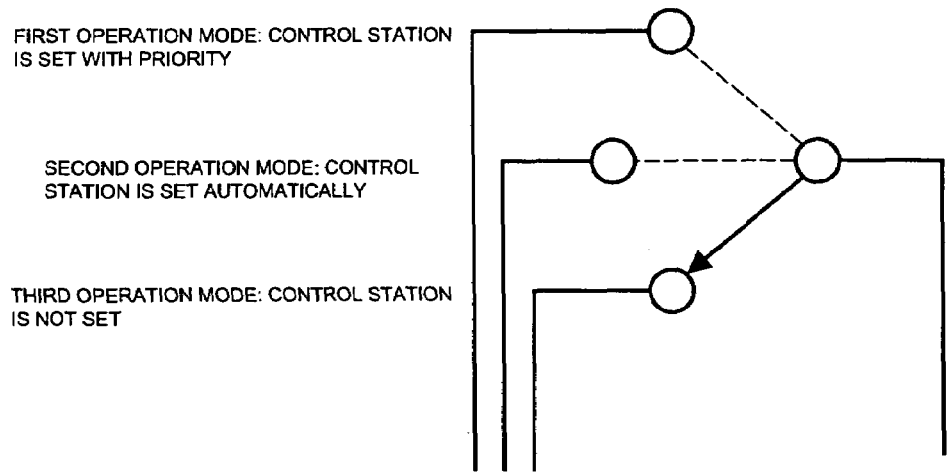
FIG. 7 shows an example of the configuration of a switch provided with a function for switching the operation mode of the control station in the mode setting section 36 shown in FIG. 3, and more specifically, shows a state in which setting for not allowing the apparatus to operate as a control station in a third operation mode is performed

FIGS. 5 to 7 show an example of the configuration of a switch provided with a function for switching the operation mode of the control station in the mode setting section 36 shown in FIG. 3.

The switch has a function for switching between three types of operations. In these figures, a setting for making effective the function for making the apparatus become a control station with priority in a first operation mode, a setting for automatically determining a control station so as to operate in a second operation mode, and a setting for causing the apparatus not to operate as a control station in a third operation mode are provided. Then, as a result of which mode this switch is connected to being output to this control section 37, the mode is notified to the control section 37.

FIG. 5 shows a state in which a setting for causing the wireless communication apparatus 10 to become a control station with priority in the first operation mode is performed.

FIG. 6 shows a state in which a setting for automatically selecting a control station in the second operation mode is performed.

FIG. 7 shows a state in which a setting for causing the wireless communication apparatus 10 not to operate as a control station in the third operation mode is performed.

The mode settings shown in FIGS. 5 to 7 are preset, for example, before shipment of the wireless communication apparatus 10 from factory. However, after shipment, the user can change and set the mode via the mode setting section 36.

For example, when a control-station apparatus and a plurality of terminal-station apparatuses are to be shipped together, as shown in FIG. 5, only one wireless communication apparatus which serves as a control station can be set in advance to the first operation mode so that that wireless communication apparatus becomes a control station with priority, and as shown in FIG. 7, the other wireless communication apparatuses which serve as terminal stations can be set in advance to the third operation mode in which the wireless communication apparatuses do not operate as a control station.

Furthermore, in a case where the user additionally buys a wireless communication apparatus as necessary and introduces it into the existing wireless network, by setting the apparatus to the second operation mode shown in FIG. 6 so that the control station is automatically determined, the wireless communication apparatus can be made to operate in accordance with the selection by the user.

A description will now be given below of the control-station changing operation performed in step S4 in the flowchart shown in FIG. 4.

Figure 8:
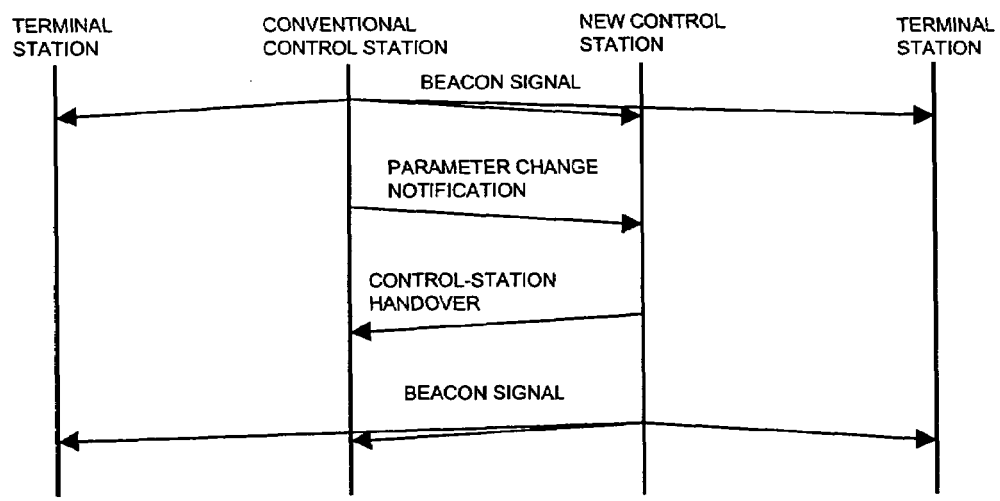
FIG. 8 is a chart showing an information exchange sequence for a control-station changing operation performed between a wireless communication apparatus (conventional control station) which has been operating as a control station and a wireless communication apparatus (new control station) which will operate as a control station in response to the switching to the first operation mode.

FIG. 8 shows an information exchange sequence for a control-station changing operation performed between a wireless communication apparatus (conventional control station) which has been operating as a control station and a wireless communication apparatus (new control station) which will operate as a control station in response to the switching to the first operation mode. It is assumed here that a wireless network is formed in such a manner that the conventional control station transmits a beacon signal at predetermined intervals.

Initially, when a wireless communication apparatus (new control station) which requests a change of control station exists in the wireless network, a parameter changing notification is transmitted to the conventional control station.

The conventional control station receiving this parameter changing notification compares the received parameter with the parameter of the station itself. When it is determined that the wireless communication apparatus which has sent the parameter changing notification, that is, the new control station, is suitable for use as the control station of the network, a control-station changing operation is performed.

Specifically, a new control station is specified by a control-station handover command, and the time at which the authority is transferred to that control station is written therein. After the written time has passed, a wireless network is formed with the new control station as the center.

On the other hand, when it is determined that the new control station is not suitable for use as the control station of the wireless network, the control station is not changed, and the existing network continues to operate.

At this time, when the wireless communication apparatus which has sent the parameter changing notification, that is, the new control station, receives the control-station handover, the process proceeds to step S10 in accordance with the "Yes" branch in step S5, and the wireless communication apparatus newly operates as a control station.

In order that the new control station operates as a control station in the wireless network, by transmitting a beacon signal in the time written in the control-station handover in place of the conventional control station, the function of the control station is transferred.

If the control-station handover is not received, the process proceeds to step S12, where the operation for joining the wireless network is performed, after which, in step S13, the apparatus operates as a terminal station rather than a control station.

A description will now be given below of an example of a control-station selection process performed in step S8 in the flowchart shown in FIG. 4.

Figure 9:
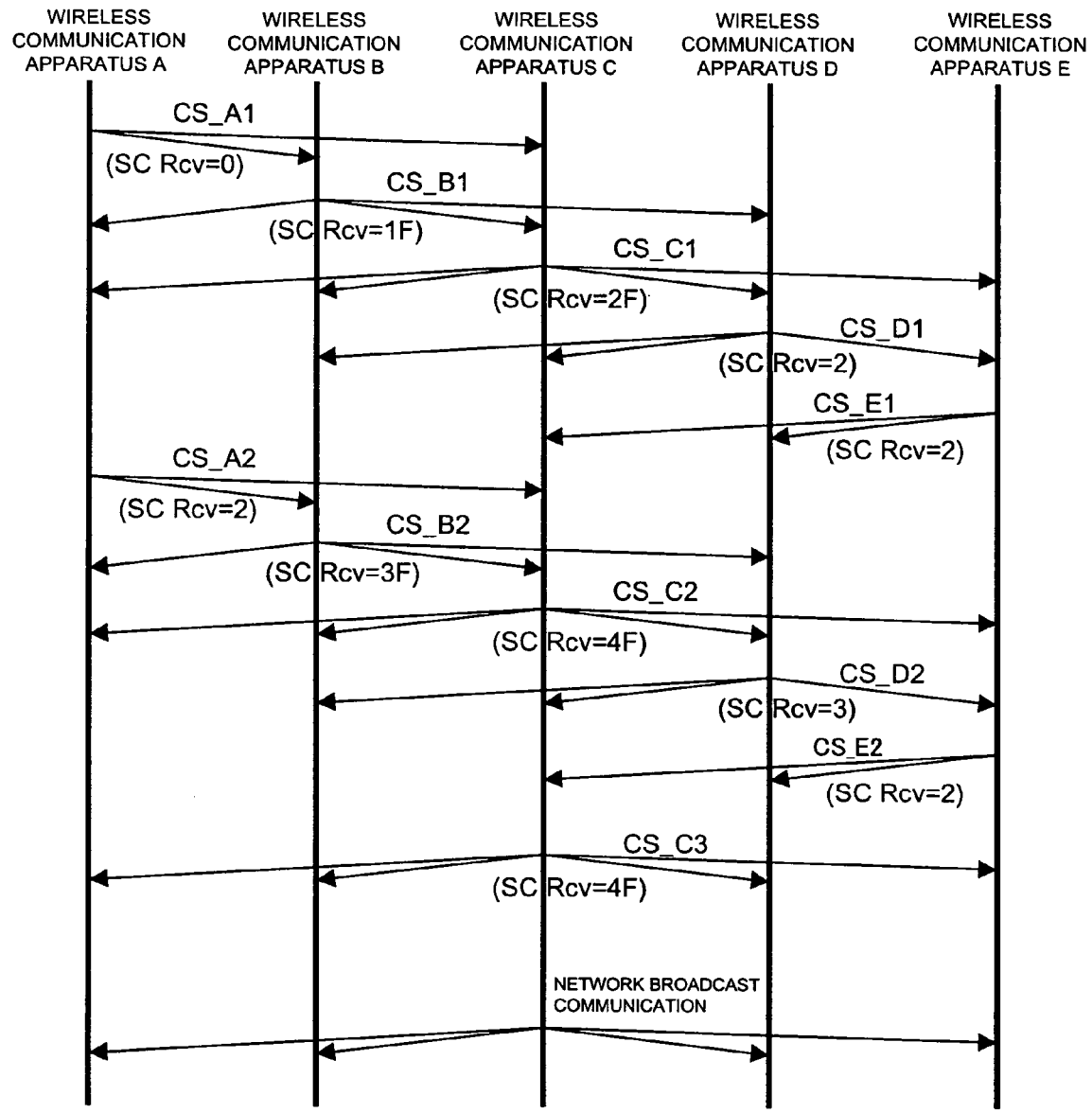
FIG. 9 shows an information exchange sequence for a control-station selection process in the wireless network according to this embodiment.

FIG. 9 shows an information exchange sequence for a control-station selection process in the wireless network according to this embodiment. It is assumed that the wireless network shown in FIG. 9 comprises five wireless communication apparatuses, that is, a wireless communication apparatuses A to E, and that the user has already selected two wireless communication apparatuses, communication apparatuses B and C, as control stations.

As shown in FIG. 9, this control-station selection process is formed of a process of exchanging control-station selection information for the first time, a process of exchanging control-station selection information for the second time, and control-station determination and notification processes.

In the process of exchanging control-station selection information for the first time, predetermined transmission and reception of information is performed among wireless communication apparatuses which form the wireless network. Next, in the process of exchanging control-station selection information for the second time, likewise, predetermined transmission and reception of information is performed among wireless communication apparatuses which form the wireless network in a manner similar to the first control-station selection process.

Then, in the processes of determining and notifying the selected control station, each wireless communication apparatus determines whether or not that wireless communication apparatus itself is most suitable as a control station on the basis of the information obtained by the process of exchanging the control-station selection information for the second time. The wireless communication apparatus which has determined that that wireless communication apparatus itself is most suitable as the control station notifies the other wireless communication apparatuses that that wireless communication apparatus itself is selected as a control station. Thereafter, a network broadcast is transmitted sent, a predetermined frame period is set, and thus a wireless network is constructed.

[Process of Exchanging Control-Station Selection Information for the First Time]

The process of exchanging control-station selection information for the first time will now be described below in detail.

Referring to FIG. 9, a description will now be given using as an example a state in which a wireless communication apparatus A is newly activated while the wireless communication apparatuses B to E were already operating. In the example shown in FIG. 9, the wireless communication apparatus A is placed at a position where it can communicate with only the wireless communication apparatuses B and C. Similarly, it is assumed as follows that the wireless communication apparatus B is placed at a position where it can communicate with only the wireless communication apparatuses A, C, and D; the wireless communication apparatus C is placed at a position where it can communicate with all the other wireless communication apparatuses A, B, D, and E; the wireless communication apparatus D is placed at a position where it can communicate with only the wireless communication apparatuses C, D, and E; and the wireless communication apparatus E is placed at a position where it can communicate with only the wireless communication apparatuses C and D. Furthermore, it is assumed that the wireless communication apparatuses B and C are specified as the control stations by the user.

Initially, when the wireless communication apparatus A starts up, the wireless communication apparatus A transmits a control-station selection information signal CS_A1 for the first time.

This control-station selection information signal CS_A1 has an identifier indicating that this signal is a control-station selection information signal, an identifier (e.g., the MAC address of the wireless communication apparatus) for specifying the communication apparatus of the transmission source, and a selection determining value SC_Rcv used to determine control-station selection. This selection determining value SC_Rcv contains the number of control-station selection information signals received from other communication apparatuses by the wireless communication apparatus, and information indicating whether or not the wireless communication apparatus is selected as a control station by the user. In this embodiment, the selection determining value SC_Rcv is expressed as, for example, "0", "1F", etc. The value "0" indicates that the wireless communication apparatus has received no control-station selection information signals from the other communication apparatuses and the wireless communication apparatus has not been selected as a control station by the user. The value "1F" indicates that the corresponding wireless communication apparatus has received one control-station selection information signal from other communication apparatuses nearby and the wireless communication apparatus has been selected as a control station by the user.

The selection determining value SC_Rcv contained in the control-station selection information signal CS_A1 is transmitted as SC_Rcv=0 since the wireless communication apparatus A has received no control-station selection information signals from other communication apparatuses nearby and the wireless communication apparatus A has not been selected as a control station by the user.

As described above, based on the positional relationship among the wireless communication apparatuses, the control-station selection information signal CS_A1 transmitted by the wireless communication apparatus A reaches the communication apparatuses B and C, but does not reach the communication apparatuses D and E.

Next, the wireless communication apparatus B receiving the control-station selection information signal CS_A1 from the wireless communication apparatus A transmits a control-station selection information signal CS_B1 for the first time in a similar manner. At this time, since the wireless communication apparatus B has received the control-station selection information signal CS_A1 from the wireless communication apparatus A and has been set as a control station with priority, the wireless communication apparatus B sets that the selection determining value SC_Rcv=1F and transmits the control-station selection information signal CS_B1. This control-station selection information signal. CS_B1 reaches the wireless communication apparatuses A, C, and D, but does not reach the wireless communication apparatus E.

Next, the wireless communication apparatus C receiving the control-station selection information signal CS_A1 from the wireless communication apparatus A and the control-station selection information signal CS_B1 from the wireless communication apparatus B transmits a control-station selection information signal CS_C1 in a similar manner. At this time, since the wireless communication apparatus C has received the control-station selection information signal CS_A1 and the control-station selection information signal CS_B1 and has been set as a control station with priority, the wireless communication apparatus C sets that the selection determining value SC_Rcv=2F and transmits the control-station selection information signal CS_C1. This control-station selection information signal CS_C1 reaches the other wireless communication apparatuses A, B, D and E.

Next, the wireless communication apparatus D transmits a control-station selection information signal CS_D1 for the first time in a similar manner. At this time, since the wireless communication apparatus D has received the control-station selection information signal CS_B1 from the wireless communication apparatus B and the control-station selection information signal CS_C1 from the wireless communication apparatus C and has not been set as a control station with priority, the wireless communication apparatus D sets that the selection determining value SC_Rcv=2 and transmits the control-station selection information signal CS_D1. This control-station selection information signal CS_D1 reaches the wireless communication apparatuses B, C, and E, but does not reach the wireless communication apparatus A.

Next, the wireless communication apparatus E transmits a control-station selection information signal CS_E1 for the first time in a similar manner. At this time, since the wireless communication apparatus E has received the control-station selection information signal CS_C1 from the wireless communication apparatus C and the control-station selection information signal CS_D1 from the wireless communication apparatus D and has been set as a control station with priority, the wireless communication apparatus E sets that the selection determining value SC_Rcv=2 and transmits the control-station selection information signal CS_E1. This control-station selection information signal CS_E1 reaches the wireless communication apparatuses C and D, but does not reach the wireless communication apparatuses A and B other than those apparatuses.

This completes the control-station selection information exchange process for the first time. Each wireless communication apparatus operates in such a manner as to store the selection determining value of each communication apparatus. FIG. 10 shows examples of the stored contents of a selection determining value of each wireless communication apparatus when a control-station selection process for the first time is terminated. In FIG. 10, FIGS. 3(A) to 3(E) show examples of the stored contents of the selection determining values of the wireless communication apparatuses A to E, respectively. Each wireless communication apparatus stores the selection determining value of the apparatus itself, obtains the selection determining value contained in the control-station selection information signal sent from another wireless communication apparatus, and stores the selection determination value in such a manner as to correspond to each wireless communication apparatus.

For example, in FIG. 3(A) which shows an example of the stored contents of the wireless communication apparatus A, the fact that the selection determining value of the wireless communication apparatus A is "2", the selection determining value of the wireless communication apparatus B is "1F", the selection determining value of the wireless communication apparatus C is "2F", and the selection determining values of the wireless communication apparatuses D and E are unknown (the control-station selection information signal is not yet received) is stored. The same applies to the other wireless communication apparatuses B to E.

Each wireless communication apparatus also counts the control-station selection information signal received from another wireless communication apparatus after the control-station selection information signal is transmitted in order to manage the selection determining value of the apparatus itself. For example, in the wireless communication apparatus A, when the control-station selection information signal CS_A1 is transmitted, the selection determining value SC_Rcv is "0". But, thereafter, the control-station selection information signals CS_B1 and CS_C1 are received from the wireless communication apparatuses B and C, and these are counted. Therefore, the wireless communication apparatus A stores the selection determining value as the selection determining value SC_Rcv="2".

[Exchange of Control-Station Selection Information for the Second Time]

A description will now be given below of the exchange of control-station selection information for the second time following the exchange of control-station selection information for the first time.

After the control-station selection process for the first time is performed, after a predetermined time has elapsed, a control-station selection process for the second time is performed. The "predetermined time" refers to a time which is long enough for all the wireless communication apparatuses to transmit a control-station selection information signal and for the other wireless communication apparatuses to receive this signal.

Initially, the wireless communication apparatus A transmits a control-station selection information signal CS_A2 for the second time. At this time, as shown in FIG. 3(A), the wireless communication apparatus A contains the selection determining value SC_Rcv=2 as a result of adding together the control-station selection information signals CS_B1 and CS_C1 for the first time from the wireless communication apparatuses B and C. Similarly to the exchange process of the control-station selection information signal for the first time, the control-station selection information signal CS_A2 transmitted by the wireless communication apparatus A reaches the wireless communication apparatuses B and C, but does not reach the wireless communication apparatuses D and E.

Next, the wireless communication apparatus B receiving the control-station selection information signal CS_A2 from the wireless communication apparatus A transmits a control-station selection information signal CS_B2 for the second time in a similar manner. At this time, as shown in FIG. 3(B), the selection determining value SC_Rcv is "3F" as a result of counting the reception of the control-station selection information signal for the first time from the wireless communication apparatus D. The control-station selection information signal CS_B2 containing this selection determining value reaches the wireless communication apparatuses A, C, and D, but does not reach the wireless communication apparatus E.

Next, the wireless communication apparatus C receiving the control-station selection information signal CS_A2 from the wireless communication apparatus A and the control-station selection information signal CS_B2 from the wireless communication apparatus B transmits a control-station selection information signal CS_C2 for the second time in a similar manner. At this time, as shown in FIG. 3(C), the selection determining value SC_Rcv is "4F" as a result of counting the reception of the control-station selection information signals CS_D1 and CS_E1 for the first time from the wireless communication apparatuses D and E. The control-station selection information signal CS_C2 containing this selection determining value reaches all the other wireless communication apparatuses A, B, D, and E.

Next, the wireless communication apparatus D receiving the control-station selection information signal CS_B2 from the wireless communication apparatus B and the control-station selection information signal CS_C2 from the wireless communication apparatus C transmits a control-station selection information signal CS_D2 for the second time in a similar manner. At this time, as shown in FIG. 3(D), the selection determining value SC_Rcv is "3" as a result of counting the reception of the control-station selection information signal CS_E1 for the first time from the wireless communication apparatus E. The control-station selection information signal CS_D2 containing this selection determining value reaches the wireless communication apparatuses B, C, and E, but does not reach the wireless communication apparatus A.

Finally, the wireless communication apparatus E receiving the control-station selection information signal CS_C2 from the wireless communication apparatus C and the control-station selection information signal CS_D2 from the communication apparatus D transmits a control-station selection information signal CS_E2 for the second time in a similar manner. At this time, as shown in FIG. 3(E), the selection determining value SC_Rcv is maintained at "2". The control-station selection information signal CS_E2 containing this selection determining value reaches the wireless communication apparatuses C and D, but does not reach the wireless communication apparatuses A and B other than those apparatuses.

This completes the exchange process of the control-station selection information for the second time. Each wireless communication apparatus operates so as to store the selection determining values of the other wireless communication apparatuses. However, the wireless communication apparatus does not count the control-station selection information signal from the other wireless communication apparatuses and does not update the selection determining value of the apparatus itself.

FIG. 11 shows examples of the stored contents of a selection determining value of each wireless communication apparatus when the control-station selection process for the second time is terminated. In FIG. 11, FIGS. 4(A) to 4(E) show examples of the stored contents of the selection determining values of the wireless communication apparatuses A to E, respectively. Each wireless communication apparatus stores the selection determining value of the apparatus itself, also obtains the selection determining value contained in the control-station selection information signal sent from another wireless communication apparatus, and stores it in such a manner as to correspond to each wireless communication apparatus. As shown in FIG. 11, the stored contents of each wireless communication apparatus match each other except for the case in which the selection determining values are unknown, and this indicates the selection determining value of each wireless communication apparatus when the exchange process of the control-station selection information for the first time is terminated.

[Processes for Determining and Notifying Control Station]

A description will now be given below of processes for determining and notifying a control station, which follows the exchange process of the control-station selection information for the second time.

Each wireless communication apparatus compares the selection determining values which are stored by the apparatus itself with each other in order to determine whether or not the selection determining value of the station itself is a maximum when compared to the selection determining values of the other wireless communication apparatuses. If the selection determining value is not a maximum, the processing is terminated. If the selection determining value is a maximum, the wireless communication apparatus hereafter operates as a control station, and performs a process for reporting that fact to the other wireless communication apparatuses.

In the examples shown in FIGS. 9 to 11, since the selection determining value "4F" of the wireless communication apparatus C is a maximum, the wireless communication apparatus C determines that the apparatus itself is a control station, and the other wireless communication apparatuses A, B, D, and E wait as regular stations in order to receive a notification from the control station. The wireless communication apparatus C transmits a control-station selection notification signal CS_3 after a predetermined time has passed. Then, a network broadcast is transmitted, and a predetermined frame period is set.

Further Information

Up to this point, the present invention has been described in detail while referring to the specific embodiments. However, it is obvious that the modifications and substitutions of the embodiments can be made by a person skilled in the art within the spirit and scope of the present invention. That is, the present invention has been disclosed in the form of examples, and should not be construed as being limited. In order to determine the gist of the present invention, the claims described at the beginning should be taken into consideration.

INDUSTRIAL APPLICABILITY

According to the present invention, it is possible to provide a superior wireless communication system capable of suitably performing communication among a plurality of wireless stations, and a superior wireless communication control apparatus, a superior wireless communication control method, and a superior computer program, which are capable of suitably constructing a wireless network in which terminals directly perform communication.

According to the present invention, it is possible to provide a superior wireless communication control apparatus, a superior wireless communication control method, and a superior computer program, which are capable of suitably constructing a wireless network by allowing a specific apparatus within a wireless network to function as a control station (coordinator).

According to the present invention, it is possible to provide a superior wireless communication control apparatus, a superior wireless communication control method, and a superior computer program, which are capable of suitably constructing a wireless network by allowing a specific apparatus to function as a control station with priority.

According to the present invention, it is possible to provide a superior wireless communication control apparatus, a superior wireless communication control method, and a superior computer program, which are capable of suitably constructing a wireless network by determining a control station in such a manner as to exclude a wireless transmission apparatus which is not suitable as a control station.

According to the present invention, for each wireless communication apparatus forming the wireless network, an operation mode in which the wireless communication apparatus becomes a control station with priority, an operation mode in which the wireless communication apparatus may operate as a control station, and an operation mode in which the wireless communication apparatus does not become a control station are provided. By providing a function in which the user selects and sets one of the three types of operation modes, the wireless network can be constructed as desired by the user.

That is, by providing the wireless communication apparatus in the first operation mode with a function for becoming a control station with priority, it is possible to allow the wireless communication apparatus specified by the user to operate as a control station with priority.

Furthermore, in a second operation mode, by providing a function in which the wireless communication apparatus may operate as a control station, even if the user does not specify a control station, the control station can be selected to construct the wireless network.

Furthermore, in a third operation mode, by providing a function in which the wireless communication apparatus does not become a control station, a wireless communication apparatus which is connected to a device which cannot operate as a control station is not specified as a control station.

More specifically, as a result of providing, in addition to the first and second modes, the third operation mode in which the apparatus does not operate as a control station, setting can be performed so that a device which is not suitable as a control station because its computation function is poor, such as headphones, or a device which is not suitable to operate as a control station whose power consumption is large because it is battery driven is not selected as a control station.

By constructing a wireless network system by using wireless communication apparatuses having an operation function in such a manner as to be switched between such a plurality of operation modes, it is possible to easily construct a wireless network suitable for a personal area network by using transmission apparatuses connected to various devices.

The invention claimed is:

1. A wireless communication system in which a wireless network formed of a plurality of wireless communication apparatuses is constructed with one wireless communication apparatus operating as a control station, wherein each wireless communication apparatus comprises a mode setting section for switching an operation mode of the apparatus between a first operation mode in which the apparatus operates as a control station with priority, a second operation mode in which the apparatus operates as a control station, and a third operation mode in which the apparatus cannot operate as a control station, wherein a wireless communication apparatus in the first operation mode may operate as a control station if it is determined by the network to be most suitable to operate as a control station or if the network determines that no control station exists.

2. The wireless communication system according to claim 1, wherein, when one wireless communication apparatus within the wireless network is switched to the second operation mode in which the apparatus operates as a control station, when a control station already exists in the wireless network, the wireless communication apparatus joins the wireless network as a terminal station.

3. The wireless communication system according to claim 1, wherein, when one wireless communication apparatus within the wireless network is switched to the second operation mode in which the apparatus operates as a control station, when a control station does not exist in the wireless network, a control station is determined by a predetermined control-station selection process.

4. The wireless communication system according to claim 3, wherein, in said control-station selection process, a control station is determined based on the number of other wireless communication apparatuses with which each wireless communication apparatus set to the second operation mode can communicate.

5. A wireless communication system in which a wireless network comprising a plurality of wireless communication apparatuses is constructed with one wireless communication apparatus operating as a control station, wherein each wireless communication apparatus comprises a mode setting section for switching an operation mode of the apparatus between a first operation mode in which the apparatus operates as a control station with priority and a second operation mode in which the apparatus does not operate as a control station, wherein a wireless communication apparatus in the first operation mode may operate as a control station if it is determined by the network to be most suitable to operate as a control station or if the network determines that no control station exists.

6. The wireless communication system according to one of claims 1 and 5, wherein, in response to the switching to the first operation mode in which one wireless communication apparatus within the wireless network operates as a control station with priority, the wireless communication apparatus is activated as a control station.

7. The wireless communication system according to claim 6, wherein, when another wireless communication apparatus that operates as a control station exists in the wireless network, and an operation for changing the control station is performed, a wireless communication apparatus that is newly changed to the first operation mode in which the apparatus operates as a control station with priority is set as a control station.

8. The wireless communication system according to claim 5, wherein, in response to switching to the second operation mode in which one wireless communication apparatus within the wireless network does not operate as a control station, that wireless communication apparatus joins the wireless network as a terminal station.

9. A wireless communication control method in which a wireless network comprising a plurality of wireless communication apparatuses is constructed with one wireless communication apparatus operating as a control station, said wireless communication control method comprising a mode setting step of switching an operation mode of each wireless communication apparatus between a first operation mode in which the apparatus operates as a control station with priority, a second operation mode in which the apparatus operates as a control station, and a third operation mode in which the apparatus cannot operate as a control station, wherein a wireless communication apparatus in the first operation mode may operate as a control station if it is determined by the network to be most suitable to operate as a control station or if the network determines that no control station exists.

10. The wireless communication control method according to claim 9, wherein, when one wireless communication apparatus within the wireless network is switched to the second operation mode in which the apparatus may operate as a control station, if a control station already exists in the wireless network, the wireless communication apparatus is allowed to join the wireless network as a terminal station.

11. The wireless communication control method according to claim 9, wherein, when one wireless communication apparatus within the wireless network is switched to the second operation mode in which the apparatus operates as a control station, when a control station does not exist in the wireless network, a control station is determined by a predetermined control-station selection process.

12. The wireless communication control method according to claim 11, wherein, in said control-station selection process, a control station is determined based on the number of other wireless communication apparatuses with which each wireless communication apparatus set to the second operation mode can communicate.

13. A wireless communication control method in which a wireless network comprising a plurality of wireless communication apparatuses is constructed with one wireless communication apparatus operating as a control station, said wireless communication control method comprising a mode setting step of switching an operation mode of each wireless communication apparatus between a first operation mode in which the apparatus operates as a control station with priority and a second operation mode in which the apparatus cannot operate as a control station, wherein a wireless communication apparatus in the first operation mode may operate as a control station if it is determined by the network to be most suitable to operate as a control station or if the network determines that no control station exists.

14. The wireless communication control method according to one of claims 9 and 13, wherein, in response to switching to the first operation mode in which one wireless communication apparatus within the wireless network operates as a control station with priority, the wireless communication apparatus is activated as a control station.

15. The wireless communication control method according to claim 14, wherein, when another wireless communication apparatus that operates as a control station exists in the wireless network and an operation for changing the control station is performed, the wireless communication apparatus which is newly changed to the first operation mode in which the apparatus operates as a control station with priority is set as a control station.

16. The wireless communication control method according to claim 13, wherein, in response to switching to the second operation mode in which one wireless communication apparatus within the wireless network cannot operate as a control station, that wireless communication apparatus joins the wireless network as a terminal station.

17. A wireless communication apparatus that operates on a wireless network constructed such that one wireless communication apparatus is selected as a control station, said wireless communication apparatus comprising:

a mode setting section for switching an operation mode of the apparatus between a first operation mode in which the apparatus operates as a control station with priority, a second operation mode in which the apparatus operates as a control station, and a third operation mode in which the apparatus cannot operate as a control station, wherein a wireless communication apparatus in the first operation mode may operate as a control station if it is determined by the network to be most suitable to operate as a control station or if the network determines that no control station exists; and a control section for controlling an operation of said wireless network in accordance with the operation mode set by said mode setting section.

18. The wireless communication apparatus according to claim 17, wherein, in response to the switching by said mode setting section to the third operation mode in which the wireless communication apparatus cannot operate as a control station, that wireless communication apparatus joins the wireless network as a terminal station.

19. The wireless communication apparatus according to claim 17, wherein, when the wireless communication apparatus is switched by said mode setting section to the second operation mode in which the apparatus operates as a control station, when a control station already exists in the wireless network, said control section causes that wireless communication apparatus to join the wireless network as a terminal station.

20. The wireless communication apparatus according to claim 17, wherein, when the wireless communication apparatus is switched by said mode setting section to the second operation mode in which the apparatus operates as a control station, when a control station does not exist in the wireless network, a control station is determined by a predetermined control-station selection process.

21. The wireless communication apparatus according to claim 20, wherein, in said predetermined control-station selection process, communication is performed among wireless communication apparatuses that are set to the second operation mode, and a control section is determined based on the number of other wireless communication apparatuses with which each wireless communication apparatus can communicate.

22. A wireless communication apparatus that operates on a wireless network constructed such that one wireless communication apparatus is selected as a control station, said wireless communication apparatus comprising:

a mode setting section for switching an operation mode of the apparatus between a first operation mode in which the apparatus operates as a control station with priority and a second operation mode in which the apparatus cannot operate as a control station, wherein a wireless communication apparatus in the first operation mode may operate as a control station if it is determined by the network to be most suitable to operate as a control station or if the network determines that no control station exists; and a control section for controlling an operation of said wireless network in accordance with the operation mode set by said mode setting section.

23. The wireless communication apparatus according to one of claims 17 and 22, wherein, in response to switching by said mode setting section to the first operation mode in which the wireless communication apparatus operates as a control station with priority, the corresponding wireless communication apparatus is made to operate as a control station with priority.

24. The wireless communication apparatus according to claim 23, wherein, when another wireless communication apparatus that operates as a control station exists in the wireless network, said control section performs communication with the other wireless communication apparatus and performs a control-station changing operation, causing that wireless communication apparatus to operate as a control station.

25. A method of controlling a wireless communication apparatus that operates on a wireless network constructed such that one wireless communication apparatus is selected as a control station, said wireless communication apparatus control method comprising:

a mode setting step of switching an operation mode of the apparatus between a first operation mode in which the apparatus operates as a control station with priority, a second operation mode in which the apparatus operates as a control station, and a third operation mode in which the apparatus cannot operate as a control station, wherein a wireless communication apparatus in the first operation mode may operate as a control station if it is determined by the network to be most suitable to operate as a control station or if the network determines that no control station exists; and a control step of controlling an operation of said wireless network in accordance with the operation mode set in said mode setting step.

26. The method of controlling a wireless communication apparatus according to claim 25, wherein in said mode setting step, when the wireless communication apparatus is switched in said mode setting step to the second operation mode in which the apparatus operates as a control station, when a control station already exists in the wireless network, the wireless communication apparatus joins the wireless network as a terminal station.

27. The method of controlling a wireless communication apparatus according to claim 25, wherein, in said control step, when the wireless communication apparatus is switched in said mode setting step to the second operation mode in which the apparatus operates as a control station, a control station does not exist in the wireless network, a control station is determined by a predetermined control-station selection process.

28. The method of controlling a wireless communication apparatus according to claim 27, wherein, in said control step, in said control-station selection process, communication is performed among wireless communication apparatuses that are set to the second operation mode, and a control station is determined based on the number of other wireless communication apparatuses with which each wireless communication apparatus can communicate.

29. A method of controlling a wireless communication apparatus that operates on a wireless network constructed such that one wireless communication apparatus is selected as a control station, said wireless communication apparatus control method comprising:

a mode setting step of switching an operation mode of the apparatus between a first operation mode in which the apparatus operates as a control station with priority and a second operation mode in which the apparatus cannot operate as a control station, wherein a wireless communication apparatus in the first operation mode may operate as a control station if it is determined by the network to be most suitable to operate as a control station or if the network determines that no control station exists; and a control step of controlling an operation of said wireless network in accordance with the operation mode set in said mode setting step.

30. The method of controlling a wireless communication apparatus according to one of claims 25 and 29, wherein, in said control step, in response to the switching in said mode setting step to the first operation mode in which the wireless communication apparatus operates as a control station with priority, the wireless communication apparatus is made to operate as a control station.

31. The method of controlling a wireless communication apparatus according to claim 30, wherein, in said control step, when another wireless communication apparatus that operates as a control station exists in the wireless network, communication is performed with the other wireless communication apparatus, and a control-station changing operation is performed, thereby causing the wireless communication apparatus to operate as a control station.

32. The method of controlling a wireless communication apparatus according to one of claims 29, wherein, in said control step, in response to the switching in said mode setting step to the second operation mode in which the wireless communication apparatus cannot operate as a control station, that wireless communication apparatus joins the wireless network as a terminal station.

* * * * *